United States Patent
Muxen et al.

(10) Patent No.: US 12,124,817 B1
(45) Date of Patent: Oct. 22, 2024

(54) UML DECISION MANAGEMENT CAPABILITY

(71) Applicant: Rockwell Collins, Inc., Cedar Rapids, IA (US)

(72) Inventors: Andrew B. Muxen, Cedar Rapids, IA (US); Jeffrey E. Fetta, Cedar Rapids, IA (US); Terry J. Hrabik, Louisville, NE (US); Ian J. Bull, Portland, OR (US); Stephanie D. Burns, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 168 days.

(21) Appl. No.: 17/884,961

(22) Filed: Aug. 10, 2022

(51) Int. Cl.
*G06F 8/10* (2018.01)
*G06F 8/34* (2018.01)

(52) U.S. Cl.
CPC . *G06F 8/10* (2013.01); *G06F 8/34* (2013.01)

(58) Field of Classification Search
CPC .................................................. G06F 8/00–36
See application file for complete search history.

(56) References Cited

U.S. PATENT DOCUMENTS

| | | | | |
|---|---|---|---|---|
| 6,038,393 A * | 3/2000 | Iyengar | ...................... | G06F 8/20 717/104 |
| 8,185,491 B2 * | 5/2012 | Kuester | .................. | G06Q 10/10 706/62 |
| 8,266,519 B2 * | 9/2012 | Verma | ................... | G06F 40/253 715/229 |
| 8,438,533 B2 * | 5/2013 | Fritzsche | .................. | G06F 8/10 717/126 |
| 8,527,316 B2 | 9/2013 | Cogliandro | | |
| 9,015,011 B2 * | 4/2015 | Sarkar | ..................... | G06Q 10/00 703/2 |
| 10,088,984 B2 * | 10/2018 | Plummer | ............... | G06N 20/00 |
| 10,102,110 B1 * | 10/2018 | Kimball | .............. | G06F 11/3672 |
| 11,681,964 B2 * | 6/2023 | Shetty | ................ | G06Q 10/0633 705/7.27 |
| 2005/0096950 A1 * | 5/2005 | Caplan | ............. | G06Q 10/06395 705/7.41 |

(Continued)

FOREIGN PATENT DOCUMENTS

EP          1236152 A2     9/2002

OTHER PUBLICATIONS

Konemann, Patrick. "Integrating decision management with UML modeling concepts and tools." 2009 Joint Working IEEE/IFIP Conference on Software Architecture & European Conference on Software Architecture. IEEE, 2009 (Year: 2009).*

(Continued)

*Primary Examiner* — Matthew J Brophy
(74) *Attorney, Agent, or Firm* — Suiter Swantz IP (57) ABSTRACT

A profile for a tool implementing a unified modeling language (UML) is described. The profile extends the UML to include decision management functionality. The profile includes stereotypes and customizations which generate question elements, decision elements, alternative elements, and the like. The association between the elements permits a design engineer to review previous decisions and the rationale behind the decisions. In particular, the one of alternative elements is associated with decision element by selected alternative relationship.

15 Claims, 6 Drawing Sheets

(56) References Cited

U.S. PATENT DOCUMENTS

| | | | |
|---|---|---|---|
| 2008/0288304 A1* | 11/2008 | Nores | G06Q 10/06 705/7.26 |
| 2009/0138793 A1* | 5/2009 | Verma | G06F 8/10 715/234 |
| 2009/0157582 A1* | 6/2009 | Kuester | G06Q 10/10 706/46 |
| 2010/0083212 A1* | 4/2010 | Fritzsche | G06F 8/34 703/22 |
| 2011/0265060 A1* | 10/2011 | Fritzsche | G06F 8/10 717/104 |
| 2014/0095118 A1* | 4/2014 | Broodney | G06F 30/20 703/1 |
| 2015/0363692 A1* | 12/2015 | Plummer | G06F 3/0484 706/11 |
| 2017/0098160 A1* | 4/2017 | Chaudhuri | G06N 5/00 |
| 2019/0129724 A1* | 5/2019 | Haun | G06F 8/41 |
| 2020/0090063 A1 | 3/2020 | Reynolds et al. | |
| 2021/0073824 A1* | 3/2021 | McGaw | G06N 7/01 |

OTHER PUBLICATIONS

Nguyen, Thang N. "A decision model for managing software development projects." Information & Management 43.1 (2006): 63-75 (Year: 2006).*

Kramer, Max E., et al. "Extending the Palladio component model using profiles and stereotypes." Palladio Days (2012): 7-15. (Year: 2012).*

Best Decision-Making Software, https://www.g2.com/categories/decision-making.

Confluence, DACI: Decision Documentation. https://www.atlassian.com/software/confluence/templates/decision.

GitHub, Decision Record. https://github.com/joelparkerhenderson/decision-record.

* cited by examiner

| 202 Context | 204 Question | 206 Rationale |

| 208 Decider | 210 Decision | 212 Element |

| 214 Stakeholder | 216 Alternative | 218 Analysis specification |

| 220 Assumption | 222 Uncertainty | 224 Analysis activity |

| 226 Objective | 228 State |

UML DECISION MANAGEMENT CAPABILITY

TECHNICAL FIELD

The present invention generally relates to modeling environments, and more specifically to extensions for a model in Unified Modeling Language (UML).

BACKGROUND

Design engineers may make a number of design decisions during a decision-making process. Unfortunately, the design engineers may have difficulty capturing those decisions and why the decision was made. For example, the questions that were asked, the alternatives that were considered, and the rationale for why one alternative was selected over others in response to that question may be lost to history as designs evolve.

Models may be generated by one or more tools according to any number of models-based systems engineering (MBSE) principles. Decisions made as part of the decision-making process are typically undocumented or poorly documented. The poor documentation of the models may inhibit successful reuse or design understanding of the models. In particular, UML and software tools implementing UML are difficult to support review of a model. For example, the SysML language only provides a "rationale" element. Therefore, it would be advantageous to provide a device, system, and method that cures the shortcomings described above.

SUMMARY

Embodiments of the present disclosure are directed to a system. In some embodiments, the system includes a memory maintaining program instructions. In some embodiments, the system includes a processor configured to execute the program instructions. In some embodiments, the program instructions cause the processor to configure an object-oriented modeling tool with at least one profile. In some embodiments, the at least one profile extends a visual modeling language according to a meta model. In some embodiments, the meta model includes a question element, a decision element, a decider element, a rationale element, and an alternative element. In some embodiments, the decision element is associated with the question element, the decider element, the rationale element, and the alternative element. In some embodiments, the decision element is associated with the alternative element by a selected alternative relationship. In some embodiments, the alternative element indicates an available alternative for the question element. In some embodiments, the selected alternative relationship indicates the available alternative is a selected solution for the question element.

Embodiments of the present disclosure are directed to a method. In some embodiments, the method includes executing, by a processor, program instructions maintained on a memory medium. In some embodiments, the program instructions cause the processor to configure an object-oriented modeling tool with at least one profile. In some embodiments, the at least one profile extends a visual modeling language according to a meta model. In some embodiments, the meta model includes a question element, a decision element, a decider element, a rationale element, and an alternative element. In some embodiments, the decision element is associated with the question element, the decider element, the rationale element, and the alternative element. In some embodiments, the decision element is associated with the alternative element by a selected alternative relationship. In some embodiments, the alternative element indicates a selected solution for the question element. In some embodiments, the selected alternative relationship indicates the available alternative is a selected solution for the question element.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings.

Embodiments of the present disclosure are generally directed to extending a modeling language. The modeling language may include, but is not limited to a unified modeling language (UML). UML may be extended to provide a capability to define questions, decisions, and selected alternatives within a model. UML may be extended to include a decision element. The decision element may store a question that is being decided, alternatives that are being considered as answers, selected alternatives, an individual making the decision, reference to supporting analysis and analysis approach, elements that the decision impacts, stakeholders that have an interest in the decision outcome, reference material, and/or a decision hierarchy that can help prioritize and plan for decisions. The decision element may also include a decision state to a status of the decision. The decision element may thus be used to store information associated with a decision-making process. Capturing the decisions may be used to maintain a history of the design space about why an alternative was selected. The decision element may then be used at a later time to review the decision-making process.

A profile may be created that extends UML with the decision element. The profile may allow for the definition of the various elements according to the meta model. In some instances, UML is extended through the use of stereotypes and customizations, as will be described further herein. These elements may be augmented with validation rules that ensure the model aligns with a decision-making process. Thus, the UML model elements may be generated natively within a tool. The UML model elements allows for a description of how to identify decisions that need to get made, status and plan for those decisions, record and communicate decisions, relate those decisions to affected items, and maintain a history of the decisions coupled with the affected items for future consideration and basis for reuse.

Figure 1:
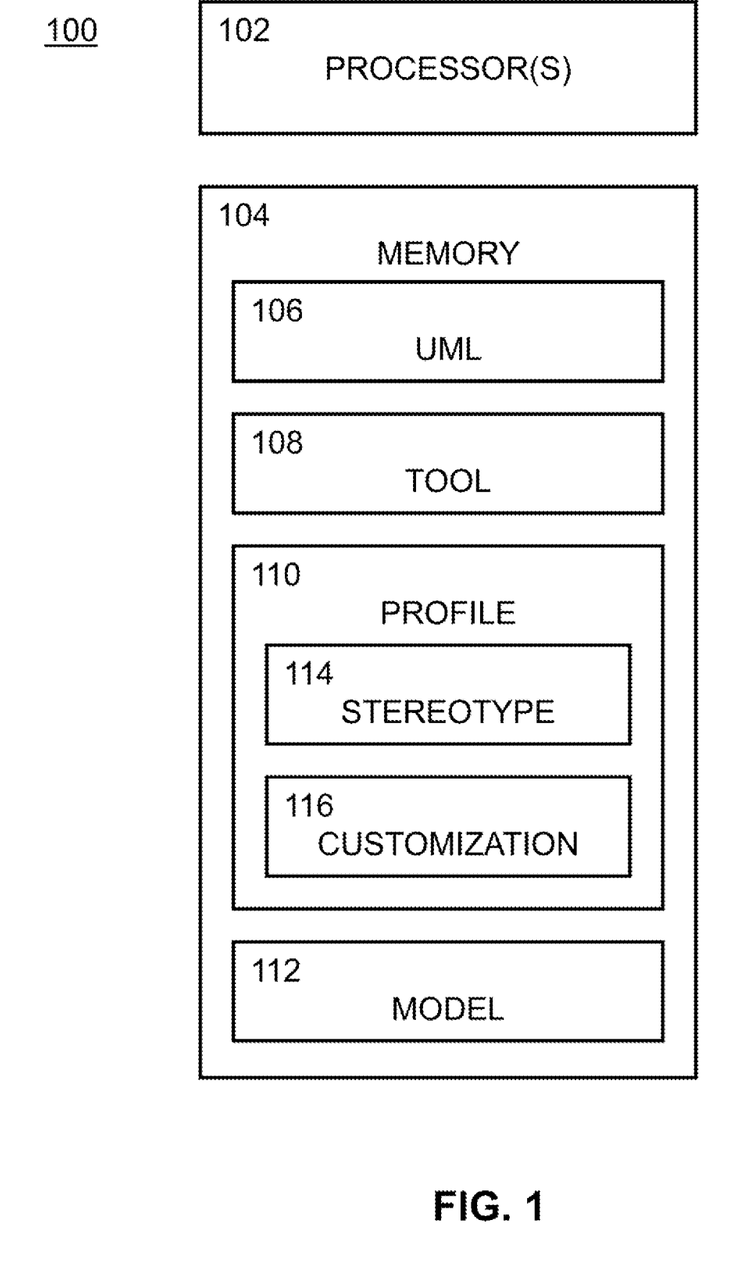
FIG. 1 depicts a simplified block diagram of a system, in accordance with one or more embodiments of the present disclosure.

Referring now to FIG. 1, a simplified block diagram of a system 100 is described, in accordance with one or more embodiments of the present disclosure. The system 100 may include one or more processor(s) 102 and memory 104.

The processor 102 may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

The memory 104 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For example, the program instructions may include one or more of a UML 106, a tool 108, a profile 110, and/or a model 112.

In embodiments, the program instructions maintained on the memory 104 may include a visual modeling language. As used herein, visual modeling may refer to a graphic representation of objects. For example, the modeling language may include a UML 106. UML 106 may be an object-oriented modeling language. As may be understood, UML 106 may generally refer to any UML specification, such as, but not limited to UML 1.X or UML 2.X. UML 106 may be defined according to one or more standards organizations, such as, but not limited to, the Object Management Group (OMG) and/or one or more International Organization for Standardization (ISO) standards.

Although much of the present disclosure is directed to the UML 106 or derivates therein, this is not intended as a limitation of the present disclosure. Much of the ideas described herein may be extended to any object-oriented modeling language that allows for extending the language. For example, SYSML2 is set to be released and won't be based on UML 106. SYSML2 includes an ability to extend the language. The ideas may be translated into SYSML2 or another modeling language. For example, element may refer to a UML class, a SYSML block, a Department of Defense (DoDAF) performer, or anything that is defined in UML 106 or the languages or extensions of UML 106.

In embodiments, the program instructions maintained on the memory 104 may include a modeling tool. For example, the modeling tool may include a tool 108. The tool 108 may implement one or more functions of UML 106. A number of tools are known in the art, such as, but not limited to Cameo™ (also referred to herein as MagicDraw™). The Cameo™ tool may be modified with customizations to various functionality, as will be described herein. Although much of the present disclosure is directed to the tool being the Cameo™ tool, this is not intended as a limitation of the present disclosure.

The program instructions maintained on the memory 104 may include a profile 110. The profile 110 may be a package which extends a meta model of the tool 108, in accordance with the UML specification. As used herein, meta model may describe properties of models which are capable of being generated by the tool 108. In embodiments, the profile(s) 110 may extend the UML 106 to include various functionality in the tool 108. As used herein, package may refer to a number of classes, stereotypes, and/or customizations.

When using the tool 108 with the profile 110, the tool 108 may include decision management functionality. The profile 110 may also be referred to herein as a decision profile. The decision profile may satisfy the needs of certification processes, capability maturity model integrated (CMMI), internal processes, and the like.

The system 100 may generate a model 112 using the tool 108 with the profile(s) 110. The model 112 may visually represent various objects. In embodiments, the model 112 may visually depict a decision-making process. As used herein, model may refer to an abstraction of any number of physical processes occurring in the real world, such as, but not limited to the decision-making process. The profile 110 may be used by an engineering project that tailors the decision to the needs of the program. The profile 110 may be used by a design engineer, and the like, to store the decisions made during the design process. As may be understood, the model 112 may be generated on a case-by-case basis and may be based on the requirements of the specific decision process.

The profile(s) 110 may include one or more stereotypes 114. As used herein, stereotype may refer to an extensibility mechanism within UML 106. The stereotypes extend the UML language across one or more tools. In some instances, the stereotypes may be labelled by guillemets surrounding the word stereotype (i.e., <<stereotype>>). In some instances, the stereotypes may be represented by a colored box (e.g., a yellow color). In embodiments, the stereotypes 114 may create decision features within the tool 108. Although the profile 110 has been described as being implemented in software as a stereotype 114 with attributes, this is not intended as a limitation of the present disclosure. Instead, the profile 110 may be implemented in software by the use of a block with value properties. A block may refer to a SYSML element. Properties may be added to the block. The block may be opened and processed.

The profile(s) 110 may also include one or more customizations 116. As used herein, customization may refer to a tool specific element used to extend the tool 108. In particular, the customization may be used where the tool is the Cameo™ tool. The customizations may look at the stereotype and change the tool 108 to make the stereotypes easier to use or automated in the tool 108. The customizations 116 may define how the tool 108 interprets and presents the stereotype 114 to the user. Without the customization 116, the stereotypes 114 may exist. However, the stereotypes must be created, have the stereotype 114 selected from all stereotypes, and then applied to the class of an element within the model 112. All elements of a certain kind having the associated stereotype may be selected by default using the customizations 116. When editing the object to look at the specification, a set of fields may be displayed. A more useful set of fields may also be displayed using the customizations 116. The customizations 116 may add a palette. The palette provides a window to grab and drop the various elements into the diagram. For example, the customizations 116 may include a place in palette property. In some instances, the customizations 116 may be labelled by guillemets surrounding the word customization (i.e., <<customization>>) and/or be represented by a colored box (e.g., a blue color).

In embodiments, the customizations 116 may create features within the tool 108. The customizations 116 enables configuration of the tool environment to integrate a meta model in the tool. As may be understood, the customization is specific to the tool implementing the modeling language, and is not intended to be a limitation of the present disclosure. In this regard, the language may be extended and the tool may be enhanced without using the customizations 116.

Figure 2A:
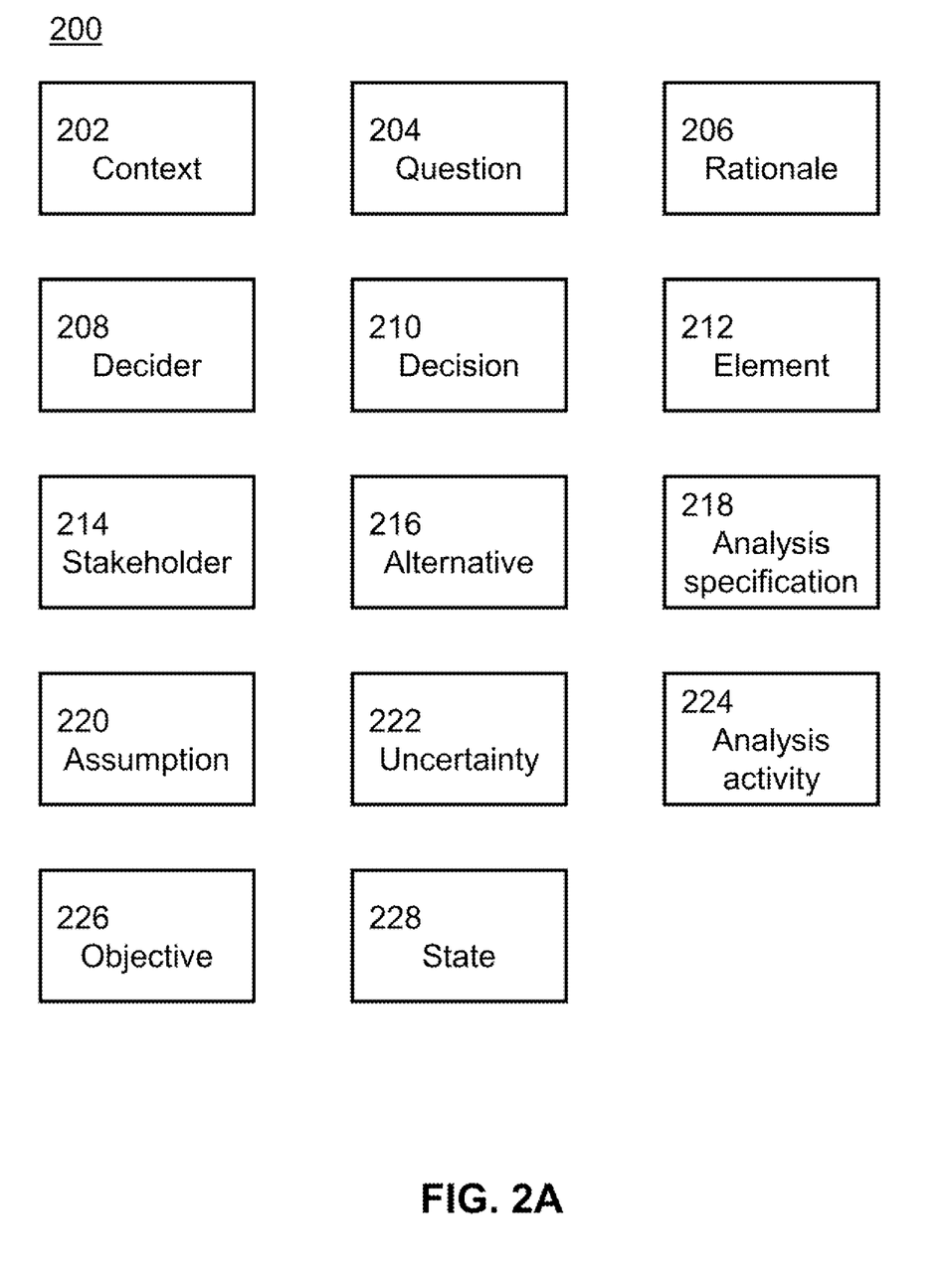
FIGS. 2A-2B depict a meta model for capturing data associated with a decision-making process, in accordance with one or more embodiments of the present disclosure.
Figure 2B:
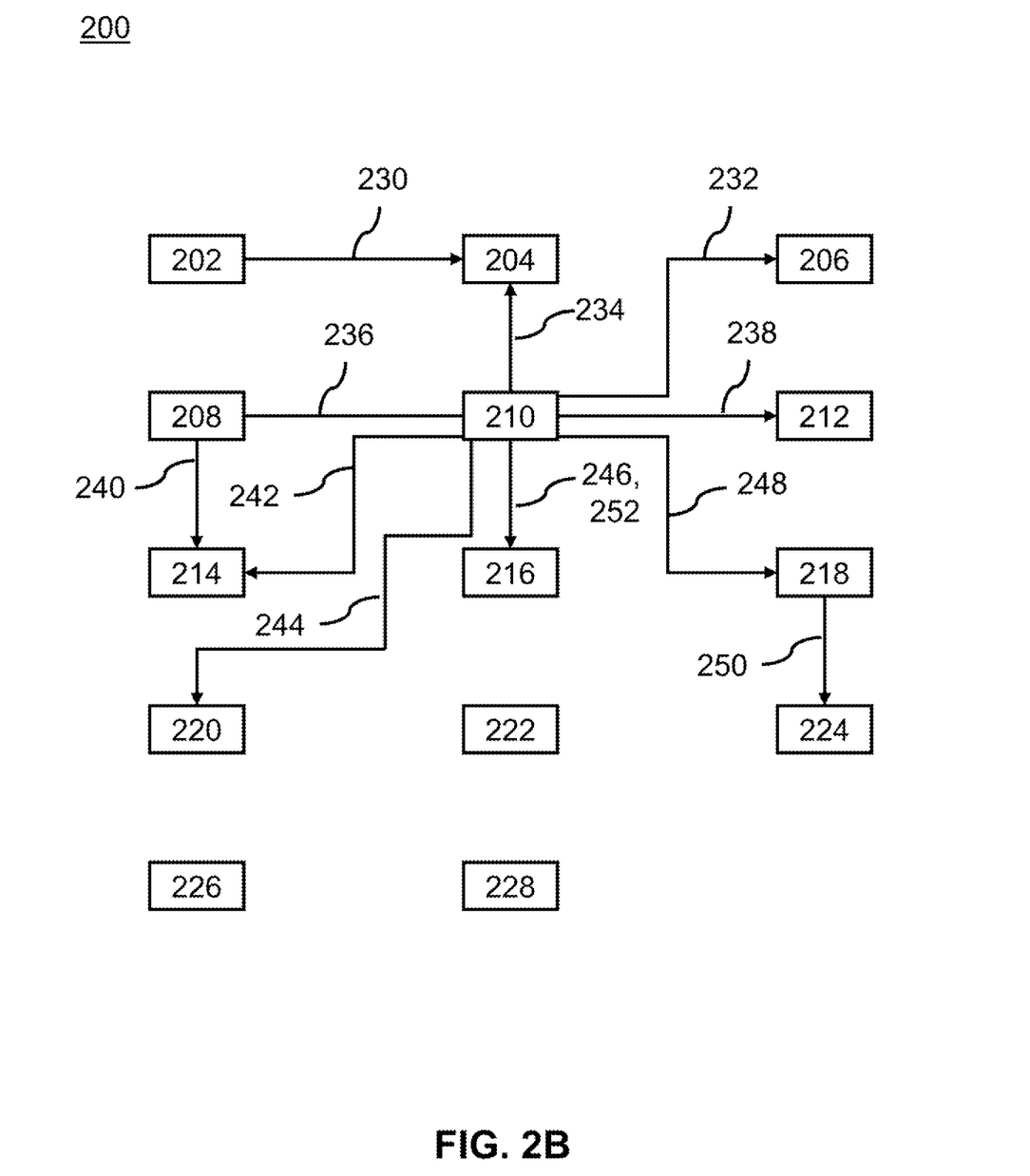

Referring now to FIGS. 2A-2B, a package depicting a meta model 200 is described, in accordance with one or more embodiments of the present disclosure. The meta model may provide a structural diagram used for implementing a decision process within software. A model may be implemented in software according to the meta model 200. The structure of the meta model 200 may allow for various information regarding a decision-making process to be stored in the model. Such information may be beneficial for a variety of purposes. As used herein, element may refer to a component of a model, a language, or a tool. Attributes may refer to properties of an element or an instance. Instance specification may refer to an existence of an entity in a model. Meta class may refer to an instance of a class element with the stereotype of meta class.

In embodiments, the decision structure may include a context element 202, a question element 204, a rationale element 206, a decider element 208, a decision element 210, an element 212, a stakeholder element 214, an alternative element 216, an analysis specification element 218, an assumption element 220, an uncertainty element 222, an analysis activity element 224, an objective element 226, and/or a state element 228. The various elements may be stored in memory by a processor. The various elements may then be retrieved from memory for a later review of the decision-making process.

The context element 202 may be used to store in memory a context during the decision-making process. A model implemented according to the meta model 200 may store the context using the context element 222. The context may be situation specific to the given decision-making process.

The question element 204 may be used to store in memory a question to be answered during the decision-making process. A model implemented according to the meta model 200 may store the question using the question element 204.

The rationale element 206 may be used to store in memory a rationale for selecting an alternative during the decision-making process. A model implemented according to the meta model 200 may store the rationale using the rationale element 206.

The decider element 208 may be used to store in memory a decision-maker during the decision-making process. A model implemented according to the meta model 200 may store the decision-maker using the decider element 208. The decision-maker may be a person who selected the alternative element as a selected solution for a question element.

The decision element 210 may be used to store in memory one or more decisions made during the decision-making process. A model implemented according to the meta model 200 may store the decisions using the decision element 210. The decision element 210 may be stored in memory at any point during a design process. For example, the decision element 210 may be stored after a decision is made. The decision element 210 may represent a decision process performed in the physical environment. The decision element 210 may include one or more attributes, as will be described further herein. The decision element 210 may include a decision approach, a reference information, a state, and the like. The decision approach may indicate an approach to how the decision is to be resolved, a summary of the analysis to be performed, and/or the how decider is going to decide the decision element. For example, a decision approach may be a based on qualitative analysis, vote, a random choice, valuing criteria, and the like. The criteria may include cost, looks, performance, and the like. The reference information may include various information which may be referenced to inform the decision. The reference information may additionally point to other model elements. For example, the reference information may point to model elements, such as, but not limited to, requirements, assumptions, external model elements, and the like. The state may indicate the decision is in a draft state, an open state, a decided state, and/or a cancelled state. The decision element 210 may generally be in a state, as indicated by the state element 228.

The element 212 may refer to one or more model elements. A model implemented according to the meta model 200 may store in memory the element using the element 212. The form of the element 212 is determined by the decision-making process. The element 212 may include a document, a database of information, a software source, a mechanical model, and the like. The element 212 may point to a larger model that is being reviewed in the context of the decision-making process.

The stakeholders in the decision-making process may be defined in software by an element, such as the stakeholder element 214. A model implemented according to the meta model 200 may store in memory the stakeholders using the stakeholder element 214. For example, a unique stakeholder element may be named after each stakeholder involved in the design-making process. A stakeholder may refer to a role and/or position within an organization. A stakeholder may also refer to an individual person.

The alternative element 216 may be used to store in memory one or more available alternatives to the question during the decision-making process. A model implemented according to the meta model 200 may store the available alternatives using the alternative element 216. The term available alternative may indicate an alternative which has been determined to be available as a solution, but which may or may not have been decided as a selected solution. Generally, one of the available alternatives will be the selected solution, with the remaining plurality being a non-selected solution.

The analysis specification element 218 may be used to store in memory one or more analysis methods used during the decision-making process. A model implemented according to the meta model 200 may store the analysis methods using the analysis specification element 218.

The assumption element 220 may be used to store in memory one or more assumptions made during the decision-making process. A model implemented according to the meta model 200 may store the assumptions using the decision element 220.

The uncertainty element 220 may be used to store in memory uncertainty during the decision-making process. A model implemented according to the meta model 200 may store the uncertainty using the uncertainty element 222. The uncertainty element 222 may indicate an area of the decision-making process that the decider is not certain about. The uncertainty element may be with the analysis and/or with the decision. For example, the uncertainty element 222 may indicate why this decision might be questioned based on this uncertainty. The uncertainty may also refer to uncertainty in input data and/or the decision-making process.

The analysis activity element 224 may be used to store in memory an analysis made by a decision maker during the decision-making process. A model implemented according to the meta model 200 may store the analysis made using the analysis activity element 224.

The objective element 226 may be used to store in memory one or more objectives to follow during the decision-making process. A model implemented according to the meta model 200 may store the objectives to follow using the objective element 226. The objective element 226 may be a statement about whether an objective was physically performed during the decision-making process.

The state element 228 may be used to store in memory a state of the decision made during the decision-making process. A model implemented according to the meta model 200 may store the state of the decisions using the state element 228. For example, the state element 228 may be one or more of a draft state, open state, decided state, and/or cancelled state.

Referring in particular to FIG. 2B, the meta model 200 may further include one or more relationships between the various elements. For example, the relationships may include, but are not limited to, an informs relationship 230, a rationale relationship 232, a question relationship 234, a decision relationship 236, an impacts element relationship 238, a stakeholder relationship 240, a stakeholder relationship 242, an assumption relationship 244, an alternative relationship 246, an analysis method relationship 248, an analysis specification relationship 250, and/or a selected alternative relationship 252.

The decision element 210 may be linked with UML elements to indicate the various information regarding a development process. Similarly, other UML elements may be associated among themselves to further indicate various information regarding a development process. The various associations may be provided by relationships in the model between the elements to indicate various information. The relationships may give a history or evidence of how the decision-making process occurred as part of the engineering process. The various relationships may include a multiplicity of zero or greater, exactly one, and/or one or greater.

As used herein, multiplicity may indicate the number of allowable associations between the elements in a model implemented according to the meta model 200. For example, a multiplicity of zero or greater (e.g., 0 . . . *) may mean that the model is validly allowed to include zero or more of the relationships. A multiplicity of 0 . . . *may indicate zero or more of the elements are allowable in a legitimate instance of the model. By way of another example, a multiplicity of exactly one (e.g., 1) may mean that the model is required to include exactly one of the relationships to be valid. By way of another example, a multiplicity of one or greater (e.g., 1 ... *) may mean that the model is required to include one or more of the relationships to be valid.

The context element 202 may include the informs relationship 230 with the question element 204. The informs relationship 230 may indicate how the context informs the question.

The decision element 210 may include the rationale relationship 232 with the rationale element 206. The rationale relationship 232 may include a multiplicity of one or greater. The multiplicity may indicate that a model implemented according to the meta model 200 may include one or more rationales per decision.

The decision element 210 may include the question relationship 234 with the question element 204. The question relationship 234 may include a multiplicity of exactly one. The multiplicity may indicate that a model implemented according to the meta model 200 may include exactly one associated question per decision. The decision element 210 may point to or reference exactly one question element 204 by the question relationship 234. The question element 204 may then be informed by the attributes stored within the decision element 210. For example, the attributes of the decision element 210 may provide context to the question element 204. For example, the decision context may indicate why the question is the way it is and/or or the situation in which the question is asked.

The decision element 210 may include the decision relationship 236 with the decider element 208. The decision relationship 236 may include a multiplicity of exactly one. The multiplicity may indicate that a model implemented according to the meta model 200 may include exactly one decider per decision. Thus, the person who is making the decision may be identified by viewing the decision relationship 236 and the decider element 208.

The decision element 210 may include the impacts element relationship 238 with the element 212. The impacts element relationship 238 may include a multiplicity of at least one. The multiplicity may indicate that a model implemented according to the meta model 200 may include one or more elements in the model which are impacted by the decision. The decision may impact one or more elements in a model. For example, the decision may impact a block, an activity, a comment, and the like. Thus, the meta model 200 may allow a model developer to link elements 212 of the model with the various decision related elements.

The decider element 208 may include the stakeholder relationship 240 with the stakeholder element 214. The stakeholder relationship 240 may indicate the decider element 208 is a stakeholder in the decision-making process. The decider may be one of a number of stakeholders.

The decision element 210 may include the stakeholder relationship 242 with the stakeholder element 214. The stakeholder relationship 242 may include a multiplicity of zero or greater. The multiplicity may indicate that a model implemented according to the meta model 200 may include zero or more stakeholders impacted by the decision. The stakeholder may be impacted the decision. The stakeholder may also be informed about the decision that gets made.

The decision element 210 may include the assumption relationship 244 with the assumption element 220. The assumption relationship 244 may include a multiplicity of zero or more. The multiplicity may indicate a model implemented according to the meta model 200 may include zero or more assumptions associated with the decision and similarly that zero or more decisions may be made during the decision-making process. Thus, assumptions made during the decision-making process may be stored as part of the model.

The decision element 210 may include the alternative relationship 246 with the alternative elements 216. The alternative relationship 246 may include a multiplicity of one or greater. The multiplicity may indicate that a model implemented according to the meta model 200 must include one or more alternates to be valid. The multiplicity may also indicate that a decision-making process must include at least one solution.

The decision element 210 may include the analysis method relationship 248 with the analysis element 218. The analysis method relationship 248 may include a multiplicity of at least one. The multiplicity may indicate a model implemented according to the meta model 200 may require at least one analysis method for the decision. A decision-making process may include any number and type of analysis methods. The analysis method may be used to make the decision and referenced to the decision.

The analysis element 218 may include the analysis specification relationship 250 with the analysis activity element 224. The analysis specification relationship 250 may include a multiplicity of zero or greater. The multiplicity may indicate that a model implemented according to the meta model 200 may include zero or more analysis activities according to the analysis specification. The multiplicity may also indicate that an analysis performed does not need to be implemented according to each analysis specification. The decision may also reference an analysis activity. The analysis activity may specify what kind analysis is to be performed. The analysis activity may store the actual analysis. The analysis activity may also include a result of the analysis.

The analysis element 218 may include the selected alternative relationship 252 with the analysis activity element 224. The selected alternative relationship 252 may include a multiplicity of zero or greater. The multiplicity may indicate a model implemented according to the meta model 200 may include no analysis performed on the decision to be valid. The decision alternatives may list out what kinds of alternatives are able to be selected. One of those decision alternatives may then be the selected alternatives which may be visible by the selected alternative relationship 252. The decision alternative may include a selected alternative based on the rationale that is stored.

Although not depicted, the decision element 210 may be related to the objective element 226. Each decision may generally include one or more objectives to be met.

Figure 3:
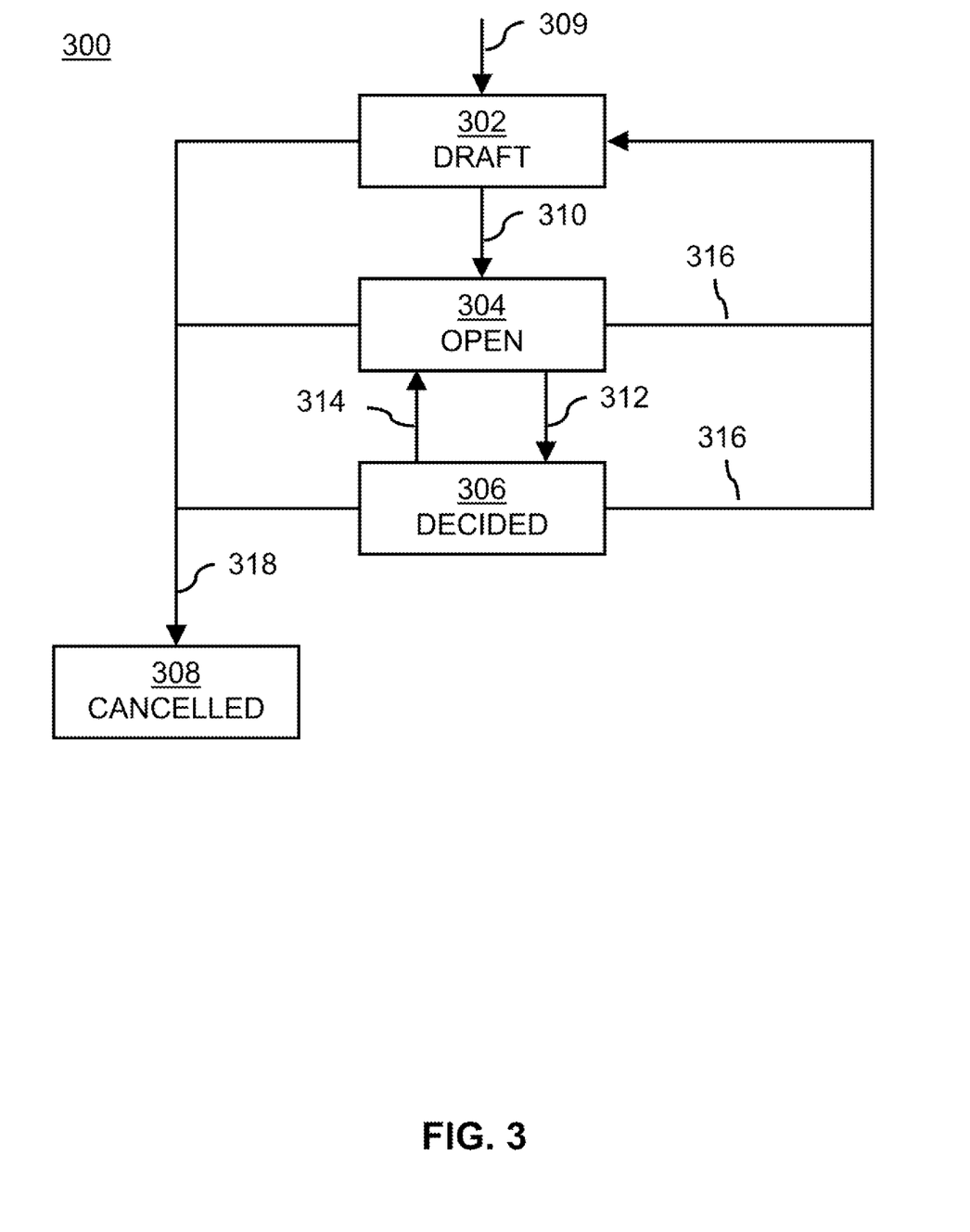
FIG. 3 depicts a state machine for controlling a state of a decision element, in accordance with one or more embodiments of the present disclosure.

Referring now to FIG. 3, an exemplary state machine 300 of a state, is described, in accordance with one or more embodiments of the present disclosure. The state machine 300 may be provided to control the state element 228 of the decision element 210 between one or more states. The state machine 300 may include one or more states including, but not limited to, a draft state 302, an open state 304, a decided state 306, and/or a cancelled state 308. The state machine 300 may provide a rationale regarding how a processor may change a stage from one state to another state. As used herein, defining may refer to populating an element of the model with data. The element may be populated with data by inputting a string or another data type into a blank field.

The state element 228 may be set to the draft state 302 in a step 309. The step 309 may occur in response to a model being generated and the question element being generated within the model. The question may be generated within the model as a blank field to be defined by inputting the question.

The state element 228 may be set to the open state 304 from the draft state 302 in a step 310. The step 310 may occur in response to the question element 204 being defined. The step 310 may also occur when the decider element 208 is generated and paired with the decision element 210 by the decider relationship 236. The step 310 may also occur once the decider has determined the question is clearly stated and/or has determined the question is worded to allow alternatives.

The state element 228 may be set to the decided state 306 from the open state 304 in a step 312. The step 312 may occur when an alternative is selected and a rationale is stored. The state machine 300 may determine the alternative is selected by the decision element 210 having the selected alternative relationship 252 with the alternative element 216. The state machine 300 may determine the rationale is stored by the decision element 210 having the rationale relationship 232 with the rationale element 206. In this regard, the decided state may indicate that the question may include a selected solution with an associated rationale, as indicated by the selected alternative relationship 252 and the rationale relationship 232. A person may then visually see why the alternative was selected by viewing the relationships within the model. This may be advantageous in documenting a history of the decision-making process for future design iterations.

The state element 228 may be set to the open state 304 from the decided state 306 in a step 314. The step 314 may occur when a decision is reconsidered. The state machine 300 may determine the decision is reconsidered when the selected alternative relationship 252 is removed from the decision element 210. The state machine 300 may change the state element 228 to the open state 304 from the decided state 306 when the selected alternative relationship 252 is removed from the decision element 210.

The state element 228 may be set to the draft state 302 from one or more of the open state 304 and/or the decided state 306 in a step 316. The step 316 may occur when the question element 204 or the decider element 208 is modified. The state machine 300 may determine the question element 204 is modified when a change is made to the question element 204. Similarly, the state machine 300 may determine the decider element 208 is modified when a change is made to the decider element 208.

The state element 228 may be set to the cancelled state 308 from the draft state 302 and/or the open state 304 in a step 318. The step 318 may occur when a question is deemed unnecessary or overcome by events.

As may be understood, the state machine 300 may include additional rules other than those depicted and described. Advantageously, the state machine 300 may provide an indication of states and the criteria before moving between the states. In embodiments, the program instructions maintained on the memory 104 may cause the processor 102 to implement the state machine 300 and/or follow the steps according to the state machine 300.

Figure 4:
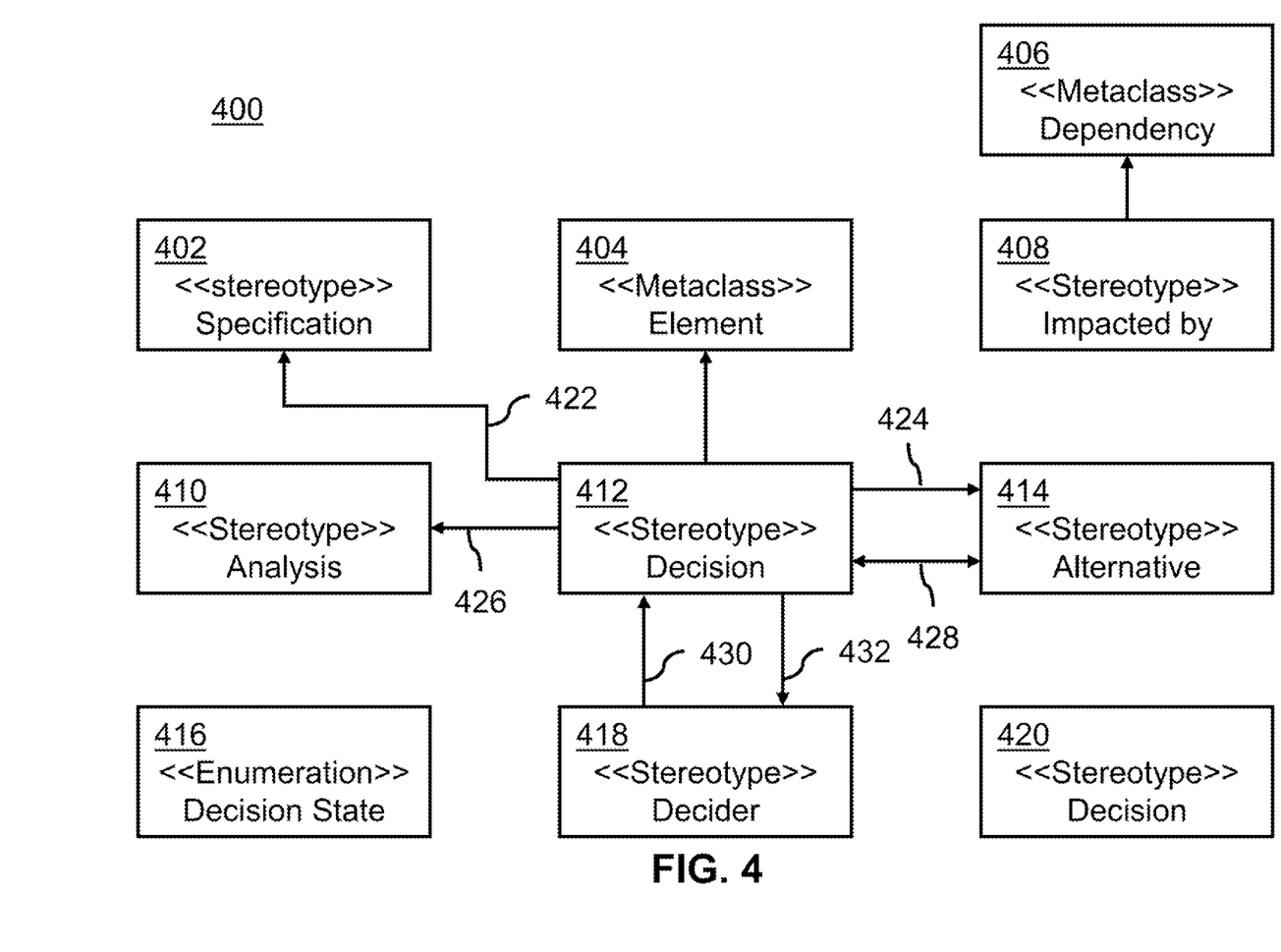
FIG. 4 depicts a profile for configuring an object-oriented modelling tool, in accordance with one or more embodiments of the present disclosure.

Referring now to FIG. 4, a profile 400 is described, in accordance with one or more embodiments of the present disclosure. In embodiments, the profile 400 may depict an implementation of the meta model 200. The profile 400 may then be used by a design engineer for capturing information associated with a decision-making process. As may be understood, the profile 400 is not intended to be limiting. For example, the various features of the metaclass may be implemented by in a single common profile and/or multiple profiles, such that at least one profile may be used to implement the various features. One or more exemplary attributes or properties are now described. As may be understood, the exemplary properties and/or attributes are not intended to be limiting. The profile 400 may be an instantiation of the ideas described in regards to the meta model 200.

The profile 400 may include stereotypes represented as classes with the guillemet of <<stereotype>>, metaclass represented as classes with the guillemet of <<metaclass>>, enumerations represented as classes with the guillemet of <<enumeration>>, and/or customizations represented as classes with the guillemet of <<customization>>. Stereotypes may refer to a data type of the tool which defines how an existing metaclass may be extended. Metaclass may refer to classes in a meta model. Enumeration may refer to a data type of the tool which defines a list of strings. Customization may refer to a data type used to define properties of a stereotype.

The profile 400 may include one or more of an analysis specification stereotype 402, an element metaclass 404, a dependency metaclass 406, an impacted by stereotype 408, an analysis stereotype 410, a decision stereotype 412, an alternative stereotype 414, a decision state enumeration 416, a decider stereotype 418, and/or a decision stereotype 420. The profile 400 may further include one or more relationships between the various stereotypes. For example, the profile 400 may include an analysis method relationship 422, a selected alternative relationship 424, a decision analysis relationship 426, an alternative relationship 428, an assigned decision relationship 430, and/or a decider relationship 432. In some instances, one or more of the above-described elements, customizations, instances, and the like may be split into any number of profiles.

The decision stereotype 412 may implement one or more features of the decision element 210. The decision stereotype 412 may be related to one or more of the various stereotypes. The various relationships may include a multiplicity of zero or greater, exactly one, and/or one or greater. The decision stereotype 412 may include one or more attributes. For example, the decision stereotype 412 may include a question attribute, a rationale attribute, a decision number attribute, and/or a decision state attribute. The question attribute, the rationale attribute, and/or the decision number may be stored as a string. The decision number may indicate a unique number associated with the decision. For example, the unique number may be generated and associated with the decision stereotype 412 when the decision is created. The decision number may be automatically generated. The decision number may then be used to track the decision associated with the decision stereotype 412. The decision stereotype 412 may include the decision state. The decision state may be defaulted to draft. The decision state may include, but is not limited to, draft, open, decided, and/or cancelled. The decision stereotype 412 may be related to a decider, analysis, analysis method, and decision alternatives.

The analysis specification stereotype 402 may implement one or more features of the analysis specification element 218. The decision stereotype 412 may be related to the analysis specification stereotype 402 by the analysis method relationship 422. The analysis method relationship 422 may include a multiplicity of one or greater. The multiplicity may indicate that the decision may include one or more analysis methods.

The analysis stereotype 410 may implement one or more features of the analysis activity element 224. The decision stereotype 412 may be related to the analysis stereotype 410 by the decision analysis relationship 426. The decision analysis relationship 426 may include a multiplicity of one or greater. The multiplicity may indicate the decision may require at least one analysis using an analysis method.

The alternative stereotype 414 may implement one or more features of the alternative element 216. The alternative stereotype 414 may be used to store one or more alternative solutions to a question associated with a question. The alternative stereotype 414 may store the different alternatives. The stereotype may be applied to a package, system, model element. The stereotype may point to a number of components within the model. By pointing to the elements, the alternative stereotype 414 may indicate the component is an alternative solution. The decision stereotype 412 may be related to the alternative stereotype 414 by the alternative relationship 428. The alternative relationship 428 may include a multiplicity of one or greater. The multiplicity may indicate that the decision may include one or more alternatives. The decision stereotype 412 may also be related to the alternative stereotype 414 by the selected alternative relationship 424. The selected alternative relationship 424 may include a multiplicity of exactly one. The multiplicity may indicate that only one alternative may be selected for the decision.

The decider stereotype 418 may implement one or more features of the decider element 208. The decision stereotype 412 may be related to the decider stereotype 418 by the assigned decision relationship 430. The assigned decision relationship 430 may include a multiplicity of zero or greater. The multiplicity may indicate that a decider may or may not be assigned to a decision. The decider stereotype 418 may also be related to the decision stereotype 412 by the decider relationship 432. The decider relationship 432 may include a multiplicity of exactly one. The multiplicity may indicate that the decision may include only one decider.

The decision stereotype 420 may be similar to the decision stereotype 412, with the exception that the decision stereotype 420 is configured without the various relationships of the decision stereotype 412. In this regard, the decision stereotype 420 may be advantageous in the ability to more rapidly store a decision using the decision stereotype 420. However, the decision stereotype 420 may include reduced functionality to maintain relationships in a model.

The analysis specification stereotype 402 may include one or more attributes. For example, the analysis specification stereotype 402 may include a point of contact attribute and/or a step attribute.

In embodiments, the profile 400 includes the decision stereotype 420. The decision stereotype 420 may include one or more attributes. For example, the decision stereotype 420 may include the alternatives of the decision stereotype 412. The decision stereotype 420 may additionally include a list of alternatives and/or a selected alternative. The list of alternatives and/or the selected alternative may be stored as strings.

In embodiments, the profile 400 may include one or more customizations (not depicted).

A customization may include an impacted by relationship. A dependency meta class may be extended to make a relationship called "impacted by". As used herein, a dependency meta class may refer to a relationship between one or more model elements that require a specific model element for implementation. Thus, the impacted by relationship may limit a relationship between a decision element and at least one other element in the model. Decisions may thus only include impacted by relationships coming from the decision and going to other elements in the model. The impacted by relationship may indicate the element in the model is impacted by the decision. The impacted by relationship may be beneficial the design engineer to referencing the elements in the model when the selected alternative is changed.

A customization may include types for source property. The types for source may make the decision the source of the impacted by relationship.

A customization may include various place on pallet properties. The place on pallet properties may add the various elements to a palette of the modeling tool.

A customization may include a derived property. The derived property may be populated every time an impacted by relationship is made. The element may then keep a list of things that it impacts and populates that list. For example, a decision element may include a derived attribute. The derived attribute may list the elements impacted by the decision element. The elements may be automatically generated by the impacted by relationships linking the decision element with the elements impacted by the decision element.

Figure 5:
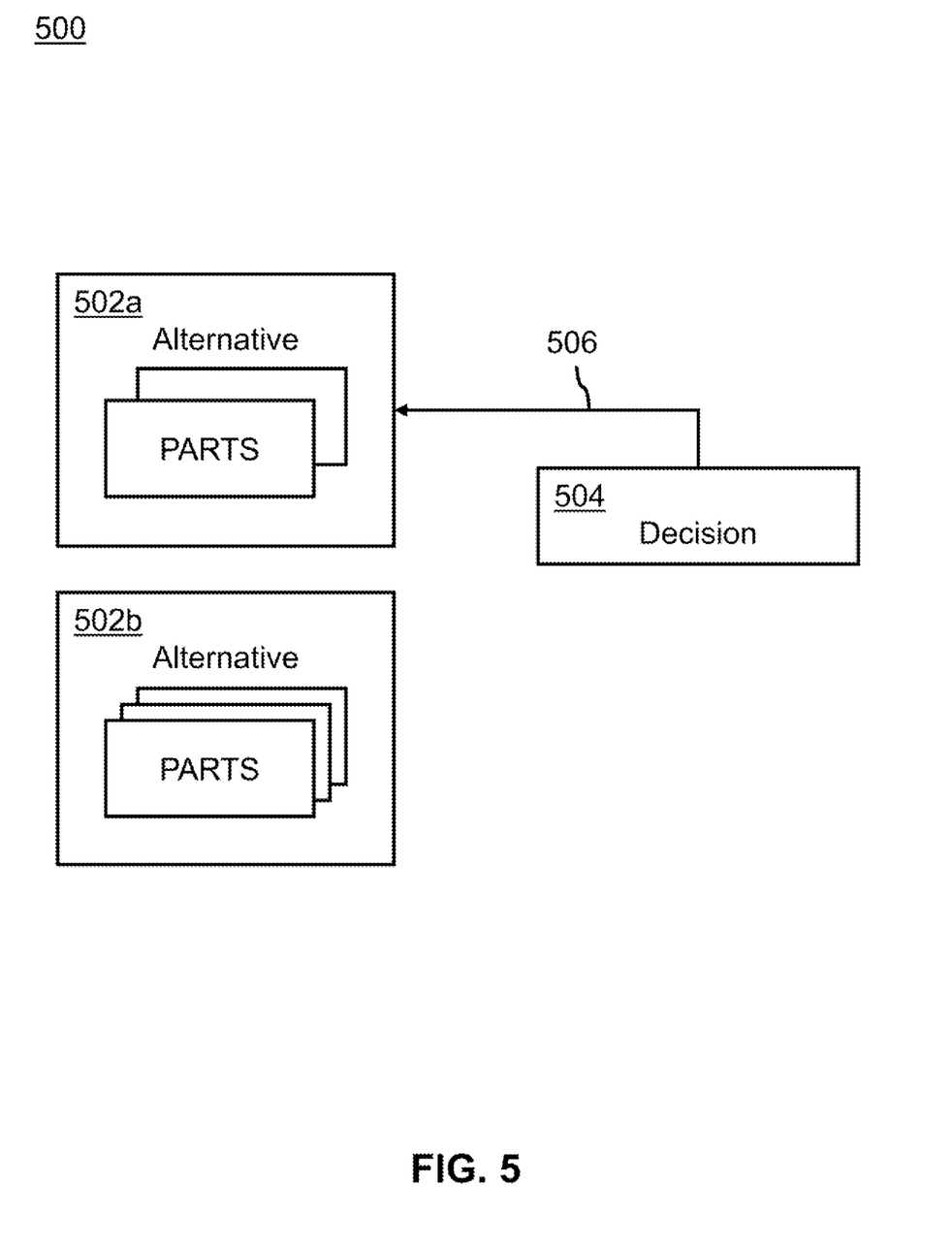
FIG. 5 depicts a model generated by an object-oriented modelling tool configured according to a profile, in accordance with one or more embodiments of the present disclosure.

Referring now to FIG. 5, a model 500 is described, in accordance with one or more embodiments of the present disclosure. The model 500 may be implemented according to the meta model 200. The model 500 may also be implemented in software by an object-oriented modeling tool configured according to the profile 400. The model 500 may include one or more alternatives 502 (e.g., an alternative 502*a* and an alternative 502*b*). As depicted, the alternative 502*a* includes two parts and the alternative 502*b* includes three parts. The model 500 may also include a decision 504. The decision 504 may be linked to the alternative 504*a* by a relationship 506. The relationship 506 may indicate that the alternative 502*a* was selected during a decision-making process. Although not depicted, the decision 504 may include various other properties previously described herein. For example, the decision may include a decision number, state, question, rationale, and the like.

A person (e.g., a designer or developer) involved in the decision-making process may use the modelling tool configured with the profile 400 to store information about the decision-making process. Thus, developers may be provided with a mechanism to store the questions that were asked, the alternatives that were considered, and the rationale for why one alternative was selected. For example, the developer may design a piece of hardware with a component. The developer may choose between two alternatives (e.g., the alternative 502*a*, the alternative 502*b*). The developer may choose the alternative 502*a* for a number of reasons. Later, when redesigning the hardware, the rationale for choosing the alternative 502*a* may be viewed within the model 500. The developer may then reconsider the rationale in light of the current circumstances (e.g., new technical skills, different hardware requirements, budgets, etc.).

Referring generally again to FIGS. 1-5.

In embodiments, elements may be associated with other elements by dragging and dropping the elements on top of one other. The system may then automatically create a relationship between the elements based on the stereotype of the elements. For example, an element with a first stereotype may be dragged and dropped onto an element with a second stereotype. The system may be automatically associated the first element with the second element.

Although not depicted, a decider may generally follow a procedure for making decisions. The decider may first define a question. The decider may identify items that are impacted based on the question. The decider may select objectives and measure against the objectives. The decider may select a method for resolving the question. The decider may generate alternative to the resolution method. The decider may assess the resolution methods. The decider may also communicate the decisions. In some instances, the decider may utilize the profile to assist in the process flow.

In embodiments, a meta model and/or a profile may include a decision hierarchy (not depicted). The decision hierarchy may indicate how the decisions impact themselves or predecessor decisions. The decision hierarchy may be stored in a decision tree. For example, a decision made by a decider may include selecting between one or more alternative components. Before selecting one of the components, the decider may first decide a budget for the decision. The budget may be an input to the decision. Put another way, the budget may be listed higher than the selected alternative in the decision-making tree. The model may then be used in a subsequent decision-making process in the event the budget is changed.

In embodiments, the question may include a relationship to a question poser (not depicted). The relationship to the question poser may indicate who is asking the question.

In embodiments, a timeframe for the decision may be defined. The timeframe may indicate how quickly the decision is to be made. For example, the timeframe may include timeframe such as, but is not limited to, urgent, standard, low. By way of another example, the timeframe may include a priority such as, but is not limited to, high priority, medium priority, or low priority.

In embodiments, the decision element may include an icon. The icon may be a diamond shape, although this is not intended to be limiting. The icon may signify that the decision element is a decision. The icon may also include a color indicating the state of the decision. The icon may thus visually indicate what state the decision is in.

In embodiments, a method may include executing program instructions causing a processor to configure an object-oriented modeling tool with at least one profile. The at least one profile may include any of the various features previously described herein. The method may additionally include generating a model using the object-oriented modeling tool configured with the at least one profile.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system comprising:
a memory maintaining program instructions; and
a processor configured to execute the program instructions causing the processor to configure an object-oriented modeling tool with at least one profile;
wherein the at least one profile extends a visual modeling language according to a meta model; the meta model including a question element, a decision element, a decider element, a rationale element, and an alternative element;
wherein the decision element is associated with the question element, the decider element, the rationale element, and the alternative element; wherein the decision element is associated with the alternative element by a selected alternative relationship; wherein the alternative element indicates an available alternative for the question element; wherein the selected alternative relationship indicates the available alternative is a selected solution for the question element;
wherein the visual modeling language comprises a unified modeling language (UML); wherein the visual modeling language is extended by a plurality of stereotypes; wherein the plurality of stereotypes includes a decision stereotype including a decision state; wherein the decision state includes a draft state, an open state, a decided state, and a cancelled state; wherein the processor is configured to set the decision state to the draft state in response to the question element being generated; wherein the processor is configured to set the decision state from the draft state to the open state in response to the question element being defined and the decider element being associated with the decision element by a decider relationship.

2. The system of claim 1, wherein the processor is configured to store a rationale for selecting the alternative element as the selected solution for the question element in the rationale element.

3. The system of claim 2, wherein the processor is configured to store a decision-maker who selected the alternative element as the selected solution for the question element in the decider element.

4. The system of claim 3, wherein the processor is configured to store a question to be to be answered in the question element.

5. The system of claim 1, wherein the processor is configured to set the decision state from the open state to the decided state in response to the rationale element being defined and the selected alternative relationship being associated with the alternative element.

6. The system of claim 1, wherein the decision stereotype further includes a decision number.

7. The system of claim 1, wherein the visual modeling language is extended by the plurality of stereotypes and a plurality of customizations; wherein the object-oriented modeling tool comprises Cameo.

8. The system of claim 7, wherein the plurality of customizations includes an impacted by customization; wherein the impacted by customization limits an impacted by relationship between the decision element and at least one other element in a model implemented according to the meta model.

9. The system of claim 8, wherein the plurality of customizations includes a derived property; wherein the derived property is populated when the impacted by relationship is made.

10. The system of claim 1, wherein the alternative element is one of a plurality of alternative elements defined within the meta model for the question element; wherein the meta model includes a multiplicity of exactly one for the selected alternative relationship.

11. The system of claim 1, wherein the processor is configured to generate a model using the object-oriented modeling tool configured with the at least one profile.

12. The system of claim 1, wherein the meta model includes a stakeholder element; wherein the decision element is associated with the stakeholder element by a stakeholder relationship; wherein the stakeholder relationship indicates the stakeholder element is impacted by the decision element.

13. The system of claim 1, wherein the meta model includes an analysis specification element; wherein the decision element is associated with the analysis specification element by an analysis method relationship; wherein the analysis method relationship indicates the decision element includes the analysis specification element as an analysis method.

14. A method comprising:

executing, by a processor, program instructions maintained on a memory medium, the program instructions causing the processor to configure an object-oriented modeling tool with at least one profile;

wherein the at least one profile extends a visual modeling language according to a meta model; the meta model including a question element, a decision element, a decider element, a rationale element, and an alternative element;

wherein the decision element is associated with the question element, the decider element, the rationale element, and the alternative element;

wherein the decision element is associated with the alternative element by a selected alternative relationship; wherein the alternative element indicates a available alternative for the question element; wherein the selected alternative relationship indicates the available alternative is a selected solution for the question element;

wherein the visual modeling language comprises a unified modeling language (UML); wherein the visual modeling language is extended by a plurality of stereotypes; wherein the plurality of stereotypes includes a decision stereotype including a decision state; wherein the decision state includes a draft state, an open state, a decided state, and a cancelled state; wherein the processor is configured to set the decision state to the draft state in response to the question element being generated; wherein the processor is configured to set the decision state from the draft state to the open state in response to the question element being defined and the decider element being associated with the decision element by a decider relationship.

15. The method of claim 14, further comprising: generating a model using the object-oriented modeling tool configured with the at least one profile.

* * * * *